June 11, 1963     M. G. WHITE ETAL     3,093,559
TREATMENT OF LATERITIC ORES
Filed June 20, 1958
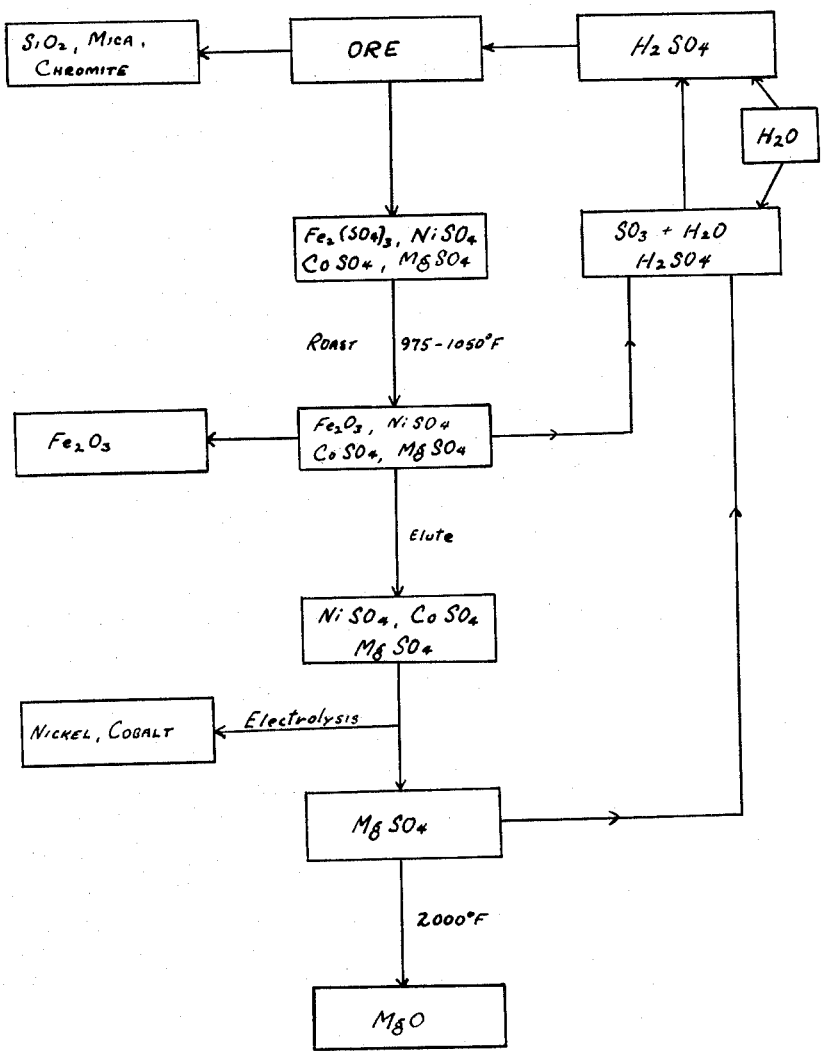
INVENTORS
MERWIN G. WHITE & JOHN H. WHITE JR.
BY
Morgan, Finnegan, Durham & Pine ¹
United States Patent Office 3,093,559
Patented June 11, 1963

3,093,559
TREATMENT OF LATERITIC ORES
Merwin G. White, 3920 South 5200 West St., Salt Lake City 4, Utah, and John H. White, Jr., 106 N. Mall, Willow Lawn, Richmond, Va.
Filed June 20, 1958, Ser. No. 743,510
6 Claims. (Cl. 204—123)

This invention relates to a process for the refining of metals contained in ores substantially comprised of iron. More particularly this invention relates to the refining of lateritic ores largely comprised of iron, nickel, cobalt, chromium, magnesium, silica, mica and alumina.

Current difficulties experienced in discovering accessible ore deposits rich in nickel forced reconsideration of the commercial exploitation of ores containing only minor amounts of this metal. Ores which heretofore have been considered lacking in sufficient amounts of nickel to make them commercially attractive are again being considered as a source of this metal, the demand for which continues to increase with each passing year. Prior attempts at recovering this metal through hydro-metallurgical processes appear to have been unsuccessful commercially particularly when sulphuric acid was used as a lixivating agent. The hydro-metallurgical approach to ore refining is to be preferred to smelting because of the more ready handling of the ore and the minimizing of the need for large amounts of fuel.

An object of this invention is the efficient recovery from low grade ores of a concentrated product containing iron suitable for sintering, for iron ore feed or for use as a pigment.

Another object is to prepare high grade nickel-cobalt cathodes.

A further object of this invention is the recovery of chromium and magnesium concentrates.

A still further object of the invention is the recovery of any excess sulphuric acid or sulphur oxides for reuse in the process.

Other objects and advantages of the invention will be set forth in part hereinafter and in part will be obvious herefrom, or may be learned by practice with the invention, the same being realized and attained by means of the steps, methods and compositions of matter pointed out in the appended claims.

The single FIGURE of the drawing illustrates the several steps of the process of this invention.

The applicants have discovered that a particularly efficient leaching of the ores treated by their method may be accomplished if the sulphuric acid used in the leaching of the ores is utilized in a concentration in the range of from 25 to 50% by weight. This range is critical since where more concentrated solutions are used a hard sinter is formed which is difficult to handle, while on the other hand if a more dilute solution is used the reaction is too slow to be used practically or does not take place at all. The preferred strength of acid used for the process of this invention is 42%. In order for the leaching to start it is necessary that the acid solution be warm. Applicants have found this is readily accomplished by mixing the concentrated sulphuric acid with water just prior to beginning the leaching step. The dilution of the concentrated sulphuric acid, being exothermic, provides sufficient heat thereby to initiate the process of lixivation.

The non-sulphide lateric ores which are most efficiently treated by the process of applicants are red and brown, amorphous masses of disintegrated rock formed by weathering of a basic peridotite. The chemical composition of the ores efficiently dealt with by the processes of this invention are approximately as follows:

|  | Percent |
|---|---|
| Iron | 25–35 |
| Magnesium | 5–15 |
| Nickel | 0.8–1.50 |
| Cobalt | 0.10–0.15 |
| Chromium | 2.00–3.50 |

It has been found that in treating ores of the composition set forth above that the sulphuric acid consumed per each percent of metal present in the ore treated is as follows:

Iron uses 62.6 lbs. of acid per ton of ore;
Magnesium uses 48.6 lbs. of acid per ton of ore; and
Nickel and cobalt use 33.4 lbs. of acid per ton of ore.
(The sulphuric acid referred to being at a concentration of 64.5 Baumé)

The scheme of treatment for the ore is as follows: The ore to be treated is placed in a lead-lined vessel, comprising the usual apparatus for the conventional lixivation of ore. Sulphuric acid of a concentration of 64.5° Bé, is run into a mixing tank containing water until the mixing tank contains an aqueous sulphuric acid solution having a concentration of 25–50% by weight. The thus diluted acid which is now quite hot as a result of the exothermic nature of its dilution, is run into the leaching vessel in an amount greater than the stoichiometric amount necessary to dissolve all the metal values in the ore. The lixivation is allowed to continue until the reaction is complete. The reaction is complete when the frothing and boiling in the vessel have ceased. Essentially all of the soluble metal values are now in solution, separated from a pulp comprising silica, mica and chromite. After the dissolved metals have been removed from the vessel the residual pulp can be tabled or jigged in order to concentrate the chrome ore by gravity as well as any gold or platinum that may be present.

The leaching solution is run through suitable filters to insure freedom from any pulp yet remaining and contains iron, nickel, cobalt and the bulk of the magnesium which was contained in the original ore. This solution preferably is virtually saturated, the metals being present in the form of sulphates. This solution is taken to dryness in an evaporator. As dryness is approached the temperature is raised to within the range of 975–1050° F. This causes any unreacted sulphuric acid to boil off and also breaks down the ferric sulphate to ferric oxide with the emission of sulphur oxides. The sulphuric acid and sulhpuric oxide produced by the roasting are taken off overhead and run to a scrubber. The ferric oxide which is usually in the form of hematite, is separated from the sulphates of nickel, cobalt and magnesium by a hot water washing step wherein the sulphates are dissolved, leaving behind the insoluble ferric oxide.

The solution of the sulfate of nickel, cobalt and magnesium is then adjusted to a pH in the range of from 2–6 and preferably within the range of 2 to 4. The solution is subjected to electrolysis using a sheet nickel anode and a solid cylinder of pure copper as a cathode. The electrolysis is carried out at a temperature of about 20° C. using a current density of from 20 to 50 amperes per square foot of electrode. This results in the formation of high grade nickel-cobalt cathodes and which leaves magnesium sulphate as the sole constituent of the solution.

The magnesium sulfate solution is warmed and the moisture evaporated to saturation, then chilled and the MgSO₄ crystals thus formed are roasted at 2,000° F. The result is an evolution of sulphur oxides which are taken off overhead and returned to a scrubber from which they will be formed into sulphuric acid for reuse in the leaching step and the magnesium sulphate converted to magnesium oxide or magnesite.

The following specific embodiment is set forth by way of exemplification and not limitation.

400 grams of laterite ore was leached with 1,000 ml. of sulphuric acid having specific gravity of 1.32 after dilution.

The ore treated had the following analysis:

|  | Percent |
|---|---|
| $Fe_2O_3$ | 35.4 |
| Ni | 1.42 |
| Co | 0.122 |
| MgO | 3.84 |
| Cr | 2.07 |

The acid leached pulp weighed 127 grams and consisted substantially of silica, mica and contained as well 1.8% $Fe_2O_3$, 1.72% MgO and only a trace of Co. This iron found in the pulp is in combination in the chromite mineral otherwise substantially all the iron is removed in the leach. The acid leached solution after drying, roasting at 1,000° F. and water leaching, gave up 200 grams of $Fe_2O_3$, which was 90.6% of the $Fe_2O_3$ theoretically obtainable.

The water leached solution contained 5.1 grams of nickel and .75 gram of cobalt. The pH of the water leached solution was adjusted with sulphuric acid to 3.0. A current density of 30 amperes per square foot of electrode was applied to the solution held at 20° C. until the codeposition of nickel-cobalt was complete. The residual solution of magnesium sulfate is evaporated by application of heat until it is supersaturated and cooled to crystallize it. The crystals thus obtained are roasted at 2000° F. to magnesium oxide.

The invention in its broader aspects is not limited to the specific steps, methods and compositions described, but departures may be made therefrom within the scope of the accompanying claims without departing from the principles of the invention and without sacrificing its chief advantages.

What is claimed is:

1. A method for treating lateritic ores having the following composition of metals in approximate percentage by weight: iron, 25–35%; magnesium, 5–15%; nickel, 0.8–1.50%; cobalt, 0.10–0.15%; and chromium 2.00–3.50%; which comprises, as a first chemical treatment step, leaching the ore with a stoichiometric excess, based on the metal values, of a sulfuric acid solution containing between about 25 and 50% by weight sulfuric acid to produce an acid leached pulp and an acid leached solution containing substantially all the metal values iron, magnesium, nickel and cobalt; separating the acid leached pulp from the acid leached solution; drying the acid leached solution to produce an acid leached solution residue; roasting the acid leached solution residue at a temperature of between 975° and 1050° F. and recovering overhead volatilized sulphuric acid and evolved sulphur oxide; water-leaching the roasted residue; separating the insoluble ferric oxide from the water leached solution; and electrolyzing the water leached solution to separate the nickel and cobalt from said water leached solution.

2. In a method for treating lateritic ores having the following composition of metals in approximate percentage by weight: iron, 25–35%; magnesium, 5–15%; nickel, 0.8–1.50%; cobalt, 0.10–0.15%; and chromium 2.00–3.50%; the improvement which comprises, as a first chemical treatment step, leaching the ores with a stoichiometric excess, based on the metal values of a sulphuric acid solution containing between about 25 and 50% by weight sulphuric acid, thereby forming an acid leached pulp comprising the metal value chromium, and an acid leached solution comprising substantially all the metal values nickel, cobalt, magnesium and iron; separating the pulp from the acid leached solution; removing water from the acid leached solution to form an acid leached residue; roasting the acid leached residue at a temperature between about 975° and 1050° F. to insolubilize the iron values; water leaching the roasted residue; separating the insoluble iron oxide from the water leached solution, and electrolyzing the water leached solution to separate the nickel and cobalt from said water leached solution.

3. A method as set forth in claim 1 wherein the sulphuric acid solution is prepared by adding concentrated sulphuric acid to water and wherein the acid leaching step immediately follows the acid dilution step.

4. A method as set forth in claim 1 wherein the water leached solution remaining after the electrolysis step is further treated by heating said solution to remove the water and leave a magnesium sulfate residue, roasting the magnesium sulfate residue and recovering overhead the sulfur oxides evolved in the roasting step.

5. A method as set forth in claim 4, wherein the magnesium sulphate roasting step is carried out at about 2000° F.

6. A method as set forth in claim 1, wherein the sulphide oxides evolved from the roasting step are carried back with volatized excess sulphuric acid to an acid scrubber where they are reconverted to sulphuric acid and fed back into the system for use in the acid leaching step.

References Cited in the file of this patent

UNITED STATES PATENTS

| 725,998 | Sjostedt et al. | Apr. 21, 1903 |
| 1,140,682 | Hybinette | May 25, 1915 |
| 1,409,727 | Kardos | Mar. 14, 1922 |
| 1,565,353 | Estelle | Dec. 15, 1925 |
| 1,575,852 | McCormick | Mar. 9, 1926 |
| 2,105,456 | Hubler et al. | Jan. 11, 1938 |
| 2,584,700 | Hayward | Feb. 5, 1952 |
| 2,899,300 | Bailey | Aug. 11, 1959 |